United States Patent [19]

Hellstern et al.

[11] Patent Number: 5,106,900
[45] Date of Patent: Apr. 21, 1992

[54] METHOD AND ORGANOPOLYSILOXANE/ORGANIC POLYMERIC COMPOSITIONS OBTAINED THEREFROM

[75] Inventors: Ann Marie Hellstern, Clifton Park; Linda L. Mitchell, Delmar; Robert J. Halley, Schenectady, all of N.Y.

[73] Assignee: General Electric Company, Schenectady, N.Y.

[21] Appl. No.: 614,802

[22] Filed: Nov. 15, 1990

[51] Int. Cl.⁵ .............................. C08L 83/02
[52] U.S. Cl. ...................... 524/859; 524/860; 524/865; 526/279; 528/14; 528/23; 528/21; 528/24; 528/33; 528/37
[58] Field of Search ............... 524/860, 859, 865; 526/279; 528/37, 33, 23, 21, 24, 14

[56] References Cited

U.S. PATENT DOCUMENTS

| | | | |
|---|---|---|---|
| 4,465,849 | 8/1984 | Terae et al. | 528/21 |
| 4,528,390 | 7/1985 | Kimura | 528/21 |
| 4,910,252 | 3/1990 | Yonehara et al. | 526/279 |
| 4,962,165 | 10/1990 | Bortnick et al. | 526/279 |
| 4,987,180 | 1/1991 | Ohata et al. | 524/860 |

*Primary Examiner*—John C. Bleutge
*Assistant Examiner*—Margaret W. Glass
*Attorney, Agent, or Firm*—William A. Teoli; James C. Davis, Jr.; William H. Pittman

[57] ABSTRACT

The emulsion polymerization of a mixture of organic silicon monomers and vinyl containing organic monomer is effected substantially concurrently. Flocculation of the emulsion polymerized material, and recovery of the flocculated material has been found useful in providing multi-lobed impact modifiers for a variety of organic thermoplastic polymers.

18 Claims, No Drawings

METHOD AND ORGANOPOLYSILOXANE/ORGANIC POLYMERIC COMPOSITIONS OBTAINED THEREFROM

CROSS REFERENCE TO RELATED APPLICATIONS

Reference is made to copending applications Ser. Nos. 271,250 now U.S. Pat. No. 4,045,595; 271,223 now U.S. Pat. No. 4,939,205; 271,222 now U.S. Pat. No. 4,927,880; 271,246 now U.S. Pat. No. 5,025,066; 271,248; 271,230 now U.S. Pat. No. 4,939,206; 271,247; and 271,896 now U.S. Pat. No. 4,968,746 filed concurrently on Nov. 14, 1988.

BACKGROUND OF THE INVENTION

The present invention relates to certain rubbery and/or free flowing resinous organopolysiloxane/organic polymeric compositions and to their use as impact modifiers for extrudable organic thermoplastic polymers. More particularly, the present invention relates to a method of making organopolysiloxane/organic polymeric compositions by the emulsion polymerization of a mixture of organosilicon monomers and vinyl containing organic monomers, where the polymerization of the organosilicon monomer mixture occurs substantially concurrently with the polymerization of the vinyl containing organic monomer.

Prior to the present invention, as shown by European patent application 0246537A2, polymeric material consisting of a core of silicone rubber surrounded by at least two chemically different shells, is used as thermoplastic molding compounds. Hilliard, U.S. Pat. No. 3,898,300 is directed to a method for making polymeric styrene-acrylonitrile polyorganosiloxane compositions by polymerizing various vinyl monomers in the presence of an emulsion of a prepolymerized vinylsiloxane-dimethylsiloxane copolymer. European patent application 0350240 is directed to a semi-continuous method for making various compositions such as coating compositions in the form of aqueous emulsion copolymers with siloxane functionality. A critical feature of application 0350240 is that a mixture of reactive monomers, such as an ethylenically unsaturated monomer, for example, styrene, a free radical polymerizable reactive silane, such as methyl-acryloxypropyltrimethoxy silane (MATS) and a linear polysiloxane precursor, or octamethylcyclotetrasiloxane ($D_4$) is added to a solution of a polymerization initiator. In addition, the ethylenically unsaturated monomer is 70% or more of the monomer mixture and latexes having particle sizes of from about 50 to 100 nm can be prepared by this semi-continuous technique. In European patent application 0166900, there is shown a polyorganosiloxane-base graft copolymer produced by graft-polymerizing at least 1 vinyl monomer on a polyorganosiloxane. There is further described in European patent application 0249964, the grafting of a copolymer of a vinyl monomer onto a polyorganosiloxane rubber and the use of the resulting graft copolymer in a polycarbonate resin to improve the stability and impact resistance of the polycarbonate resin.

Additional silicone graft copolymers are shown in copending applications Ser. Nos. 271,250 now U.S. Pat. No. 5,045,595 and 271,248, filed Nov. 14, 1988 involving the employment of multistage polyorganosiloxane/polyvinyl-based graft polymer compositions comprising as a first stage, a cohomopolymerized substrate of silicone monomers and vinyl monomers, and at least one subsequent stage graft polymerized in the presence of the first stage latex.

Organic polymeric compositions in the form of multilobed structures are shown in EP0369203-A2 and J. Polymer Sci. Part A: Polymer Chemistry Vol. 28, 629-651 (1990). These multi-lobed structures are based on a multi-stage polymerization.

Although some of the aforementioned procedures provide various silicone/organic polymeric materials useful in various applications, such as coatings and impact modifiers for organic thermoplastic polymers, additional materials useful in particular applications resulting from the polymerization of silicone monomers and vinyl organic monomers are constantly being sought. Of particular interest are impact modifiers to further enhance the impact properties of a variety of organic thermoplastic polymers, such as aromatic polyphenylene ethers; blends of polyphenylene ethers with vinyl aromatic polymers such as polystyrene; thermoplastic aromatic polyesters; thermoplastic aromatic polycarbonates; thermoplastic aromatic poly(etherimides); and blends of thermoplastic aromatic polycarbonates and thermoplastic aromatic polyesters, poly(vinylic) resins, polysulfone, polyetherimidester and polyether sulfone.

SUMMARY OF THE INVENTION

The present invention is based on the discovery that multi-lobed organopolysiloxane/organic polymeric compositions useful as impact modifiers for a variety of organic thermoplastic polymers, and preferably aromatic organic polymers, can be obtained by effecting the polymerization of a mixture of organosilicon monomers, such as cyclic siloxanes and alkoxy silanes which occurs substantially concurrently with the polymerization of vinyl organic monomer in the form of an aqueous emulsion. The resulting latex having an average particle size in the range of from 60 to 300 nanometers is then neutralized, filtered, and flocculated. The flocculated material is recovered in the form of a free-flowing powder, or in the form of loosely agglomerated tacky granules. The aforementioned compositions have been found to be useful as impact modifiers. Unlike impact modifiers of the prior art requiring an inner siloxane rubber core or first stage and an outer vinyl shell or subsequent stage grafted to the siloxane rubber, the impact modifiers of the present invention require no outer vinyl shell or subsequent stage.

Upon termination of the substantially independent polymerization reactions, particles having an organic polymer lobe and organopolysiloxane appendage can be isolated from the latex. Optimum impact modification of a variety of thermoplastic resins can be achieved by choice of the particular organic vinyl monomer used to make the organic polymeric lobe, to ensure adhesion to the organic thermoplastic matrix. In addition, by selection of the correct ratio of organosilicon monomer to organic vinyl monomer, there can be obtained the appropriate organopolysiloxane rubber domain size. Modification of various thermoplastic resins by these organopolysiloxane/organic polymeric impact modifiers can result in an enhancement in properties of the thermoplastic resin matrices such as impact strength, tensile elongation and surface appearance.

It is not completely understood how the impact modifiers of the present invention enhance the properties of the various aromatic thermoplastic organic polymers as defined hereinafter. One possible explanation is that the impact modifiers alter their morphology during melt extrusion. A change in the morphology can result in the formation of organopolysiloxane rubber domains of sufficient size surrounded by domains of organic polymer, resulting in good matrix adhesion and the toughening of a variety of organic thermoplastic polymeric matrices, such as those comprised of various combinations of polyphenylene ether and polystyrene. For example, it has been found that a 70/30 organopolysiloxane/polystyrene composition made in accordance with the present invention, can undergo a 3–4 particle size increase in siloxane rubber domain size upon extrusion. Adhesion of the impact modifier to the matrix, as well as the final siloxane domain size, is dependent upon the proportion of organosilicon monomers to vinyl organic monomer, as well as choice of the vinyl organic monomer utilized in the preparation of the impact modifier.

STATEMENT OF THE INVENTION

There is provided by the present invention, a method which comprises, (1) effecting the polymerization of a mixture of organosilicon monomers in an aqueous emulsified mixture of such organosilicon monomers and vinyl containing organic monomer, whereby the polymerization of the mixture of organosilicon monomers is effected substantially concurrently with the polymerization of vinyl containing organic monomer, which aqueous emulsified agitated mixture comprises by weight, from about 43 to about 400 parts of the mixture of organosilicon monomers, per 100 parts of vinyl containing organic monomer, (2) neutralizing the resulting latex, (3) effecting flocculation of the resulting latex, and (4) recovering organopolysiloxane/organic polymeric material from the mixture of (3).

In another aspect of the present invention, there is provided a method for imparting improved impact resistance to an organic thermoplastic polymer which comprises, (5) blending the organic thermoplastic polymer with an impact modifier where there is used from about 1 to about 35 parts by weight of the impact modifier, per 100 parts of the thermoplastic polymer, and, (6) melt extruding the resulting blend of (5) where the impact modifier is the product obtained by (7) effecting the polymerization of a mixture of organosilicon monomers in an aqueous emulsified mixture of such organosilicon monomers and vinyl containing organic monomer, whereby the polymerization of the mixture of organosilicon monomers is effected substantially concurrently with the polymerization of vinyl containing organic monomer, which aqueous emulsified agitated mixture comprises by weight from about 43 to about 400 parts of the mixture of organosilicon monomers, per 100 parts of vinyl containing organic monomer, (8) neutralizing the resulting latex, (9) effecting flocculation of the resulting latex, and

(10) recovering organopolysiloxane/organic polymeric material from the mixture of (9).

Organopolysiloxanes which can be formed during the polymerization reaction of the mixture of organosilicon monomers used in the practice of the invention, can contain condensed units of the general formula, $R_2SiO$, $RSiO_{1.5}$, $R_3SiO_{0.5}$ and $SiO_2$.

where R is a $C_{(1-18)}$ monovalent organic radical, and preferably a monovalent hydrocarbon radical having 1 to 13 carbon atoms, or a substituted $C_{(1-13)}$ hydrocarbon radical, and R is most preferably methyl or phenyl. A limited number of R radicals also can be vinyl, mercaptoalkyl and/or allyl to facilitate grafting between the vinyl organic lobe and the siloxane appendage. Particularly preferred for facilitating grafting, are R radicals containing vinyl, acryl and/or methacryl radicals.

The preferred organosilicon monomers which can be used in the practice of the invention are included within the formula $R_n\text{-Si}(OR^1)_{4-n}$ where R is as previously defined, n is 0, 1, 2, or 3, and each $R^1$ represents hydrogen or a $C_{(1-13)}$ monovalent hydrocarbon radical selected from alkyl, or aryl, and preferably methyl, ethyl, isopropyl, and phenyl. When n is 2 or 3, $R^1$ can be

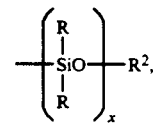

and x is preferably an integer equal to 1–10 inclusive. $R^2$ is hydrogen or a $C_{(1-13)}$ monovalent hydrocarbon radical selected from $C_{(1-8)}$ alkyl such as methyl or $C_{(6-13)}$ aryl such as phenyl. When R is a moiety reactive towards free radical polymerization, it can act as a crosslinker or as a graft linker to bind the polyorganosiloxane appendages to the organic polymer based lobe.

In addition to the aforedescribed alkoxy silanes, there can be used in combination thereof, cyclic siloxanes having from three to about six condensed siloxy units. There are included by the cyclic siloxanes, hexamethylcyclotrisiloxane, octamethylcyclotetrasiloxane, decamethylcyclopentasiloxane, dodecamethylcyclohexasiloxane, octaphenylcyclotetrasiloxane, tetramethyltetraphenylcyclotetrasiloxane and tetramethyltetravinylcyclotetrasiloxane. These cyclic siloxanes can be used alone or as a mixture.

A preferred crosslinker is tetraethoxy silane. A combination crosslinker and graft linker compound is vinyltriethoxysilane or gamma-methacryloxypropyltrimethoxysilane.

Vinyl containing organic monomer which means a single organic monomer, or a mixture thereof, is polymerized substantially concurrently with the mixture of organosilicon monomers, include alkenyl aromatic compounds, such as styrene, alpha methylstyrene, vinyltoluene, vinylnapthalene, vinylanthracene and halogenated styrene or its derivative. Other suitable vinyl monomers include (meth)acrylic acids and (meth)acrylates and derivatives thereof, such as methyl, ethyl, allyl or butyl acrylate, methacrylates, such as methyl methacrylate or ethylhexylmethacrylate; vinyl cyanides such as acrylonitrile or methacrylonitrile; olefins such as ethylene or propylene and other vinyl compounds such as vinylimidazole, vinylfuran, ethylene dimethacrylate, vinylalkyl ether, vinyl acetate, maleic anhydride, N-phenyl (or alkyl) maleimides; N-(or disubstituted) acrylamides and mixtures of any of these monomers.

Crosslinkers also can be present and include di- or trisubstituted derivatives, such as divinylbenzene, dialkyl maleate, triallyl cyanurate, dipiperidinoethane, or any of the known divinyl or polyvinyl counterparts of the above recited vinyl monomers.

Surfactants are used to emulsify the reaction mixture. Although the polymerization of the mixture of organosilicon monomers can be effected by the use of standard acid or base catalysts, certain surfactants can be used to effect the polymerization of such organosilicon material in an emulsion system. Accordingly, if desired, a combination of catalysts and surfactants can be used to polymerize the organosilicon monomers such as a combination of anionic, cationic or nonionic surfactants, as well as free acids combined with surfactants. Useful surfactants are shown by U.S. Pat. Nos. 2,891,920, and 3,294,725 and are incorporated herein by reference. The preferred surfactant is dodecylbenzene sulfonic acid.

Suitable water-soluble initiators for the vinyl containing organic monomer include for example, potassium persulfate, sodium persulfate and ammonium persulfate. Other initiators are organic soluble initiators such as azobisisobutyronitrile (AIBN) and organic peroxides. The initiator can be charged batchwise, though it is preferred that it be charged incrementally or continuously during the polymerization. In addition, free radical initiators based on redox system may also be used. Depending upon choice of initiator, there can be used from 0.1% to 5% by weight based on the weight of the vinyl monomer mixture for effective results.

In the practice of the present invention, substantially concurrent polymerization of the vinyl containing organic monomer which hereinafter, means one or more vinyl containing organic monomers as previously defined, and the mixture of organosilicon monomers can be carried out by initially homogenizing the reactants in the presence of water and surfactant. The concentration of monomers may be 5 to 50% by weight of the total reactor content, while the surfactant concentration may be 0.17%–0.75% depending on the weight % monomers chosen.

It is preferred to use a free radical initiator for the polymerization of the vinyl containing organic monomer. Although the order of addition to the homogenized mixture is not critical, it is preferred to add the initiator to the emulsified mixture of monomers. In instances where a surfactant is used which can catalyze the polymerization of the mixture of organosilicon monomers, substantial polymerization of the vinyl containing organic monomer and mixture of organosilicon monomers can be effected at 0° to 110° C., and preferably between 75° C. to 90° C. depending upon the choice of initiator for the vinyl containing organic monomer.

After the polymerization of the vinyl containing organic monomer has been completed which can be monitored by analytical techniques such as gas chromatography, the temperature of the mixture can be lowered. The polymerization of the mixture of organosilicon monomer is preferably terminated by neutralization. In instances when acid catalyzed polymerization of the organosilicon monomer mixture is used, such as when dodecylbenzenesulfonic acid is employed as both initiator and surfactant, a base can be added to the latex, such as an aqueous solution of sodium hydroxide, potassium hydroxide, sodium carbonate, potassium carbonate, sodium hydrogen carbonate, triethanolamine or triethylamine. The pH may be raised from a level of 1 to 3 to a pH of 6 to 9 and preferably 6.5 to 8.0.

Organopolysiloxane/organic polymeric impact modifiers having a multi-lobed structure can be isolated by conventional means such as flocculation. For example an electrolyte solution of 0.5 to 5% aqueous magnesium sulfate solution may be heated to 75°-85 ° C. The latex can then be added to the agitated salt solution, such as aqueous magnesium sulfate and the flocculated product isolated by filtration from the aqueous medium. The flocculated materials are recovered in the form of free flowing powders or in the form of loosely agglomerated tacky granules.

Among the organic thermoplastic polymers which can be processed under melt extrusion conditions such as temperatures in the range of 150° C. to 360° C. with the impact modifiers of the present invention, there are included polyphenylene ethers, polystyrene, polyetherimides, polycarbonates, and polyesters. Blends of polyphenylene ether/polystyrene and blends of polycarbonate and aromatic polyesters also can be used.

The impact modifier can be utilized at from about 1 to about 35 parts by weight of impact modifier per 100 parts by weight of organic thermoplastic polymer to produce organic thermoplastic polymer having improved impact resistance. Choice of the impact modifier composition is dependent on the organic thermoplastic polymer to be modified. For example, blends of polyphenylene ether having from 0 to 50 parts polystyrene can be modified preferably with impact modifiers prepared having 53–234 parts organosilicon monomer, per 100 parts of the vinyl containing organic monomer. Poly(etherimide) resins may be modified with multi-lobed impact modifier prepared having compositions preferrably in the range of 53 to 150 parts organosilicone monomer, per 100 parts vinyl containing organic monomer.

Experience also has shown that a wide variety of impact modifiers can be made based on the choice of vinyl organic monomers, or mixtures thereof, such as various acrylates, methacrylates, styrene/acrylonitrile which are used in combination with the organosilicon monomer mixture. The choice of the vinyl organic monomer selected depends upon the particular organic thermoplastic polymer chosen for impact modification. For example, tailored compositions of organopolysiloxane-poly(methyl methacrylate) impact modifiers can be effective modifiers for aromatic polycarbonates and polyalkylene terephthalate/aromatic polycarbonate resin blends.

The organic thermoplastic polymer to be modified also can dictate the ratio of organosilicon monomer to vinyl organic monomer required in preparing the impact modifier. Matrices which deform by sheer banding require smaller rubber domain sizes. Hence the organosilicon monomer component can be reduced relative to the vinyl containing organic monomer to give smaller domains of rubber upon extrusion of the final blend. More brittle matrices such as poly(styreneacrylonitrile), which can deform via crazing, can require larger rubber domains for impact modification and thus require an impact modifier having a higher organosilicon to vinyl containing organic monomer ratio but which do not exceed the level resulting in lack of exposure of the organic polymer lobe required for adhesion between the modifier and the matrix in the final extruded blend.

In order that those skilled in the art will be better able to practice the present invention, the following examples are given by way of illustration and not by way of limitation. All parts are by weight. The divinylbenzene used had an activity of 55%, the remainder being a mixture of isomers.

EXAMPLE 1

A reaction vessel equipped with a stirrer, reflux condenser, thermometer, a feed port and a heating mantle is charged with 22.6 parts deionized water, 0.12 part dodecylbenzene sulfonic acid, 6.7 parts of an organosilicon monomer mixture based on mixing 84.7 parts octamethylcyclotetrasiloxane, 9.8 parts tetraethoxysilane, 1.4 parts methacryloxypropyltriethoxysilane, and 4.0 parts tetramethyltetravinylcyclotetrasiloxane. There is also added 2.9 parts of a mixture of vinyl organic monomers based on mixing 98.0 parts styrene and 2.0 parts divinylbenzene. The above mixture is stirred and homogenized by passing the filtered solution through a Microfluidics Corp. M-100T homogenizer under a pressure of 7600-8400 psi and returning the mixture to the reactor. Stirring is continuous throughout the reaction. The temperature of the reactor is raised to 75° C. via a heating mantle, while under a nitrogen subsurface purge. At 75° C., the subsurface purge is changed to a blanket of nitrogen to maintain an inert atmosphere. The reactor is initially charged batchwise with 0.14 part of a 2% aqueous solution of potassium persulfate and incrementally charged batchwise after 1, 2, 3 and 4 hours with aliquots of 0.14 part, for a total of 0.7 part of a 2% aqueous solution. The reaction temperature is maintained at 75° C. for 2 hours after the addition of the last persulfate aliquot. The reaction mixture is stirred and allowed to cool under ambient conditions in the reactor. After 18 hours at 20°-30° C., 0.21 part of a mixture containing, by weight, 10% GAFAC RE610 (GAF Corporation, Wayne, N.J.) and 90% deionized water, is added to the reactor. After 2 hours, 0.46 part of a mixture containing, by weight, 15.0% potassium carbonate and 85.0% deionized water is slowly added to the reactor to neutralize the latex to pH 7.5. The above procedure yields a latex having % non-volatile solids of 23.2%.

To a separate reactor, equipped as above, is added 66.3 parts of a mixture containing, by weight, 1% magnesium sulfate and 99% deionized water. The temperature of the reactor is raised to 85° C. via a heating mantle. The latex from the first reactor is filtered and added to the reactor containing the stirred magnesium sulfate solution in order to flocculate the latex. The mixture is filtered via a Tolhurst centrifuge, rinsing the polymer with copious amounts of deionized water. The white polymer powder is dried for 3 days in a 60° C. vacuum oven at −25 in. Hg. The powder consisted of 70% by weight of polymerized organopolysiloxane and 30% by weight of polymerized styrene/divinylbenzene. The latex has an average particle size of 236 nm with a crosslinked polystyrene lobe and crosslinked polysiloxane appended thereto.

EXAMPLE 2

The procedure of Example 1 is repeated, except that the reactor is charged with 3.4 parts of an organosilicon monomer mixture based on mixing 84.7 parts octamethylcyclotetrasiloxane, 9.8 parts tetraethoxysilane, 1.4 parts methacryloxypropyltriethoxysilane, and 4.0 parts tetraethyltetravinylcyclotetrasiloxane. There is also charged 6.2 parts of a mixture of vinyl organic monomers, based on mixing 98.0 parts of styrene and 2.0 parts divinylbenzene.

The reactor is also charged with 1.5 part of a 2% aqueous solution of potassium persulfate which is incrementally added using 0.30 part aliquots over a 4 hour period.

There is obtained a latex having a % non-volatile solids of 27.2% before flocculation. The product has 35% by weight of polymerized organopolysiloxane and 65% by weight of polymerized styrene/ divinylbenzene. The latex has an average particle size of 134 nm with a crosslinked polystyrene lobe and crosslinked polysiloxane appended thereto.

EXAMPLE 3

The procedure of Example 2 is repeated except that 1.5 part of a 2% aqueous solution of potassium persulfate is continuously and uniformly added to the reactor, over a period of 4 hours, instead of incrementally.

There is obtained a latex having a % non-volatile solids of 26.9% before flocculation. The latex has an average particle size of 134 nm having a crosslinked polystyrene lobe and crosslinked polysiloxane appended thereto.

EXAMPLE 4

The procedure of Example 3 is repeated except that the reactor is charged with 6.2 parts of a mixture of vinyl organic monomers based on mixing 95.0 parts styrene and 5.0 parts divinylbenzene.

There is obtained a latex having a % non-volatile solids of 26.4% before flocculation. The material consists of 35% by weight of polymerized organopolysiloxane and 65% by weight of polymerized styrene/divinylbenzene. The latex has an average particle size of 197.4 nm. The particles have a crosslinked polystyrene lobe and crosslinked polysiloxane appended thereto.

EXAMPLE 5

The procedure of Example 2 is repeated except that the reactor is charged with 4.1 parts of an organosilicon monomer mixture based on mixing 84.7 parts octamethylcyclotetrasiloxane, 9.8 parts tetraethoxysilane, 1.4 parts methacryloxypropyltriethoxysilane, and 4.0 parts tetramethyltetravinylcyclotetrasiloxane. There is also added 5.5 parts of a mixture of vinyl organic monomers consisting of 98.0 parts styrene and 2.0 parts divinylbenzene.

There is obtained a latex having a % non-volatile solids of 26.2% and an average particle size of 253 nm before flocculation. The product consists of 42.5% by weight of polymerized organopolysiloxane and 57.5% by weight of polymerized styrene/divinylbenzene.

EXAMPLE 6

An organopolysiloxane-based impact modifier prepared in accordance with the procedure of Example 1, is dry blended at a concentration of 5-20 weight percent with 80-95 weight percent of powdered polyphenylene ether (PPO ® resin a product of GE Co.) (0.46 I.V.) hereinafter referred to as "PPE". The resulting blends are tumble mixed on a jar shaker to give homogeneous dispersions. The blends are then extruded on a Welding Engineer's twin screw extruder under typical conditions for the PPE resin. The extrudates are each pelletized, dried, and injection molded into test specimens on a 77 ton Battenfeld molding machine. Various physical properties are summarized in Table I showing the effect of a 70/30 SX/STY ratio where "SX" is siloxane and "STY" is styrene, as well as the impact modifier loading:

TABLE I

| SX/STY RATIO | 70/30 | → | → | → | → |
|---|---|---|---|---|---|
| % PPE resin | 95 | 90 | 85 | 80 | 100 |
| % IMPACT MODIFIER | 5 | 10 | 15 | 20 | 0 |
| NOTCHED IZOD (25° C., 10 mil, ft-lb/in) | 1.2 | 1.6 | 2.3 | 2.9 | 0.5 |
| TENSILE PROPERTIES | | | | | |
| YIELD STRESS (psi) | 9348 | 8571 | 7594 | 6854 | — |
| BREAK STRESS (psi) | 8764 | 8072 | 7498 | 6299 | — |
| MAX. STRAIN (%) | 126 | 114 | 127 | 82 | — |
| DYNATUP (25° C., 25 lb) | | | | | |
| TOTAL ENERGY (ft-lb) | 34 | 30 | 27 | 26 | — |
| ENERGY AT MAX. LOAD (ft-lb) | 33 | 28 | 26 | 25 | — |
| 60 DEGREES GLOSS | 38 | 27 | 15 | 11 | — |
| MOLDING CONDITIONS | | | | | |
| AVERAGE BARREL SET (F.) | 600 | 600 | 600 | 600 | 600 |
| MOLD SURFACE TEMP. (F.) | 160 | 160 | 160 | 160 | 160 |

SX, STY = siloxane and styrene monomers in the impact modifier
PPE resin = polyphenylene ether powder (.46 I.V.)

EXAMPLE 7

The procedure of example 3 is repeated, except that the reactor is charged with 6.2 parts by weight of a vinyl containing organic monomer mixture based on mixing 98.0 parts styrene and 2 parts of divinylbenzene. There is obtained a latex having 26.2% non-volatile solids before flocculation. The latex has an average particle size of 181 nm.

EXAMPLE 8

The procedure of example 3 is repeated, except that the vinyl containing organic monomer mixture consists of 90.0 parts styrene and 10.0 parts divinylbenzene.

A latex is obtained having a non-volatile solids content of 26.2% by weight before flocculation. The latex has an average particle size of 253 nm.

EXAMPLE 9

The procedure of example 3 is repeated except that the reaction mixture is polymerized without passing the filtered solution through a Microfluidics Corp. M-100T homogenizer under a pressure of 7600–8400 psi and returning the mixture to the reactor. A latex is obtained having a % non-volatile solids of 24.8% before flocculation. The latex has an average particle size of 62 nm.

EXAMPLES 10–14

The melt extrusion procedure of example 6 is repeated utilizing impact modifiers of examples 3, 4, and 7–9 with PPE resin. The following results are obtained:

TABLE II

| SX/STY RATIO | 35/65 | → | → | → | → | → |
|---|---|---|---|---|---|---|
| Examples | 7 | 3 | 4 | 8 | 9 | CONTROL |
| % PPE resin | 85 | 85 | 85 | 85 | 85 | 100 |
| % IMPACT MODIFIER | 15 | 15 | 15 | 15 | 15 | 0 |
| NOTCHED IZOD (25° C., 10 mil, ft-lb/in) | 3.6 | 6.4 | 6.7 | 4.4 | 1.5 | 0.5 |
| TENSILE PROPERTIES | | | | | | |
| YIELD STRESS (psi) | 10480 | 9544 | 9244 | 9428 | — | 10890 |
| BREAK STRESS (psi) | 10780 | 10340 | 10410 | 10380 | — | 10490 |
| MAX. STRAIN (%) | 155 | 162 | 176 | 171 | — | 149 |
| DYNATUP (25° C., 25 lb) | | | | | | |
| TOTAL ENERGY (ft-lb) | 43 | 45 | 42 | 36 | 44 | 6 |
| ENERGY AT MAX. LOAD (ft-lb) | 38 | 44 | 41 | 35 | 42 | — |
| 60 DEGREES GLOSS | 77 | 92 | 93 | 93 | 95 | 101 |
| MOLDING CONDITIONS | | | | | | |
| AVERAGE BARREL SET (F.) | 600 | 600 | 600 | 600 | 600 | 600 |
| MOLD SURFACE TEMP. (F.) | 185 | 185 | 185 | 185 | 190 | 185 |

SX = total siloxanes
STY = styrene polymer, including divinylbenzene (DVB)
PPE resin = polyphenylene ether powder (.46 I.V.)

EXAMPLE 15

The impact modifier of example 5 is extruded with PPE resin or a mixture of PPE resin and polystyrene, and then molded on a 28 ton Engle molder or on a 77 ton Battenfeld molder:

TABLE III

| SX/STY RATIO IN IMPACT MODIFIER | 42.5/57.5 | → | → | → | → | → | CONTROL |
|---|---|---|---|---|---|---|---|
| % PPE resin | 85 | 85 | 65 | 65 | 90 | 90 | 100 |
| % POLYSTYRENE | 0 | 0 | 20 | 20 | 0 | 0 | 0 |
| % IMPACT MODIFIER | 15 | 15 | 15 | 15 | 10 | 10 | 0 |
| CALCULATED % SILOXANE | 6.4 | 6.4 | 6.4 | 6.4 | 6.4 | 6.4 | 0 |
| NOTCHED IZOD (25° C., 10 mil, ft-lb/in) | 5.0 | 7.9 | 3.6 | 3.4 | 3.8 | 5.2 | 0.5 |
| TENSILE PROPERTIES | | | | | | | |
| YIELD STRESS (psi) | 9101 | — | 9944 | — | 9847 | — | — |
| BREAK STRESS (psi) | 9450 | — | 8206 | — | 9394 | — | — |
| MAX. STRAIN (%) | 171 | — | 93 | — | 137 | — | — |
| DYNATUP (25° C., 25 lb) | | | | | | | |
| TOTAL ENERGY (ft-lb) | — | 39 | — | 33 | — | 38 | — |
| ENERGY AT MAX. LOAD (ft-lb) | — | 34 | — | 27 | — | 33 | — |
| 60 DEGREES GLOSS | — | 86 | — | 93 | — | 93 | — |

TABLE III-continued

| SX/STY RATIO IN IMPACT MODIFIER | 42.5/57.5 | → | → | → | → | → | CONTROL |
|---|---|---|---|---|---|---|---|
| MOLDING CONDITIONS | | | | | | | |
| AVERAGE BARREL SET (F.) | 600 | 600 | 550 | 550 | 600 | 600 | 600 |
| MOLD SURFACE TEMP. (F.) | 160 | 176 | 160 | 158 | 160 | 176 | 160 |

SX, STY = siloxane and styrene monomers in the impact modifier
PPE resin = polyphenylene ether powder (.46 I.V.)
POLYSTYRENE = <Mn> = 96,500

EXAMPLE 16

The procedure of Example 5 is repeated except that the reactor is charged with the 22.6 deionized water, 0.12 part dodecylbenzene sulfonic acid, and the 6.7 parts of an organosilicon monomer mixture. After the initial batchwise charge of 0.30 part of a 2% aqueous potassium persulfate solution, the 5.5 parts of the vinyl containing organic monomer mixture is charged to the reactor continuously and uniformly over 2 hours.

There is obtained a latex having a % non-volatile solids of 26.4% before flocculation. The product has 42.5% by weight of polymerized organopolysiloxane and 57.5% by weight of polymerized styrene/divinylbenzene. The latex has an average particle size of 221 nm with a crosslinked polystyrene lobe and crosslinked polysiloxane appended thereto.

EXAMPLE 17

The melt extrusion procedure of Example 6 is repeated utilizing impact modifiers of Examples 5 and 16 with PPE resin. The following results are obtained:

TABLE IV

| SX/STY RATIO IN IMPACT MODIFIER | 42.5/57.5 | 42.5/57.5 | |
|---|---|---|---|
| EXAMPLES | 5 | 16 | CONTROL |
| % PPE | 90 | 90 | 100 |
| % IMPACT MODIFIER | 10 | 10 | 0 |
| NOTCHED IZOD (25 C., 10 mil, ft-lb/in) | 3.8 | 2.2 | 0.5 |
| DYNATUP (25 C., 25 lb) | | | |
| TOTAL ENERGY (ft-lb) | 44 | 45 | 9 |
| ENERGY AT MAX. LOAD (ft-lb) | 42 | 40 | 9 |
| 60 DEGREE GLOSS | 97 | 98 | 101 |
| MOLDING CONDITIONS | | | |
| AVERAGE BARREL SET (F.) | 600 | 600 | 600 |
| MOLD SURFACE TEMP. (F.) | 220 | 220 | 220 |

EXAMPLE 18

The procedure of Example 1 is repeated except that the reactor is charged with only 22.6 parts deionized water and 0.12 part dodecylbenzene sulfonic acid. At 75° C., the subsurface purge is changed to a blanket of nitrogen to maintain an inert atmosphere. The 6.7 parts of an organosilicon monomer mixture and the 2.9 parts of a mixture of vinyl organic monomers is combined to form a single monomer mixture. After the initial batchwise charge of 0.14 part of a 2% aqueous potassium persulfate solution, the 9.6 parts of the above monomer mixture is charged to the reactor, continuously and uniformly over 4 hours.

There is obtained a latex having a % non-volatile solids of 23.7% before flocculation. The product has 70% by weight of polymerized organopolysiloxane and 30% by weight of polymerized styrene/divinylbenzene. The latex has an average particle size of 114 nm with a crosslinked polystyrene lobe and crosslinked polysiloxane appended thereto.

Although the above examples are directed to only a few of the very many variables which can be used in the practice of the present invention, it should be understood that the present invention is directed to the use of a much broader variety of impact modifiers and organic thermoplastic polymers as shown in the description preceding these examples.

What is claimed is:

1. A method which comprises,
  (1) effecting the substantially concurrent polymerization of a mixture of organosilicon monomer selected from the class consisting of alkoxy silanes, cyclic siloxanes and a mixture thereof, and vinyl containing organic monomer in an aqueous emulsified mixture and in the presence of an effective amount of an organic peroxide as an initiator for the vinyl containing organic monomer and an effective amount of an anionic or cationic catalyst as an initiator for the organosilicon monomer, which aqueous emulsified mixture comprises by weight, from about 43 to about 400 parts of the organosilicon monomer, per 100 parts of the vinyl containing organic monomer,
  (2) neutralizing the resulting latex formed in (1) to a pH in the range of 6 to 9,
  (3) effecting the flocculation of the latex, and
  (4) recovering an organopolysiloxane/organic polymeric composition.

2. A method in accordance with claim 1, where the substantially concurrent polymerization of the organosilicon monomer and vinyl containing organic monomer is effected by adding the organic peroxide to the emulsified mixture of the organosilicon monomer and vinyl containing organic monomer.

3. A method in accordance with claim 1, where the substantially concurrent polymerization of the mixture of organosilicon monomer and vinyl containing organic monomer is effected by adding the vinyl containing organic monomer to an emulsified mixture of the organic silicon monomer and organic peroxide.

4. A method in accordance with claim 1 where the substantially concurrent polymerization of the mixture of organosilicon monomer and vinyl containing organic monomer is effected by adding a mixture of the vinyl containing organic monomer and organosilicon monomer to an aqueous medium containing the polymerization initiators.

5. A method in accordance with claim 1, where an effective amount of a water soluble alkali metal persulfate is used as an initiator for the vinyl containing organic monomer.

6. A method in accordance with claim 1, where an effective amount of dodecylbenzene sulfonic acid is utilized as a surfactant and initiator for the organosilicon monomer.

7. An organopolysiloxane/organic polymeric composition made in accordance with claim 1, which is useful as an impact modifier for extrudable organic thermoplastic materials, comprising an organic polymeric lobe and an organopolysiloxan appendage.

8. An organopolysiloxane/organic polymeric composition made in accordance with claim 1, having an average particle size of from about 60 to about 300 nm.

9. An impact modifier in accordance with claim 7, where the organosilicon monomer used in the formation of the organopolysiloxan appendage and the vinyl organic monomer used in the formation of the organic polymeric appendage have free radical reactive grafting substituents.

10. An impact modifier in accordance with claim 7, having free radical reactive crosslinking substituents on the organopolysiloxane appendage and the organic polymeric appendage.

11. An impact modifier in accordance with claim 7, where the organopolysiloxane appendage consists essentially of condensed units included within the formulas, $R_2SiO$, $RSiO_{1.5}$, $R_3SiO_{0.5}$, and $SiO_2$ wherein R is a $C_{(1-18)}$ monovalent organic radical.

12. An impact modifier in accordance with claim 7, where the organopolysiloxane appendage consists essentially of units resulting from the polymerization of an organosilicon monomer mixture having cyclic monomers selected from the class consisting of hexamethylcyclotrisiloxane, octamethylcyclotetrasiloxane, decamethylcyclopentasiloxane, dodecamethylcyclohexasiloxane, octaphenylcyclotetrasiloxane, tetramethyltetravinylcyclotetrasiloxane and mixtures thereof.

13. An impact modifier in accordance with claim 7, where the organopolysiloxane appendage consists of units resulting from the polymerization of organosilicon monomers included within the formula $R_n\text{-}Si(OR^1)_{4-n}$, where R is a monovalent hydrocarbon radical having 1 to 13 carbon atoms, or a substituted, $C_{(1-13)}$ hydrocarbon radical, n is 0, 1, 2 or 3 and each $R^1$ is selected from hydrogen or a $C_{(1-13)}$ monovalent hydrocarbon radical.

14. An impact modifier in accordance with claim 7, where the organopolysiloxane appendage consists of units resulting from the polymerization of a mixture of organosilicon monomers selected from the class consisting of octamethylcyclotetrasiloxane, hexamethylcyclotrisiloxane, tetramethyltetravinylcyclotetrasiloxane, gammamethacryloxypropyltrimethoxysilane, vinyltriethoxysilane, tetramethoxysilane, tetraethoxysilane, and tetraisopropoxysilane.

15. An impact modifier in accordance with claim 7, where the organopolysiloxane appendage consists of units resulting from the polymerization of a mixture of organosilicon monomers selected from the class consisting of octamethylcyclotetrasiloxane, tetramethyltetravinylcyclotetrasiloxane, gammamethacryloxypropyltrimethoxysilane, and tetraethoxysilane.

16. An impact modifier in accordance with claim 7, where the organic polymeric lobe consist essentially of chemically combined units selected from the class consisting of alkenyl aromatics, methacrylates, vinyl cyanide, maleimides, acrylamides, and a mixture thereof.

17. An impact modifier in accordance with claim 7, wherein the organic polymeric lobe consists essentially of a member selected from the class consisting of polystyrene, styrene/acrylonitrile copolymer, styrene/divinylbenzene copolymer, polymethyl methacrylate, methyl methacrylate/divinylbenzene copolymer, styrene/dipiperidinoethane copolymer and styrene/acrylonitrile/divinylbenzene copolymer.

18. An impact modifier in accordance with claim 7, where the organic polymeric lobe is a styrene/divinylbenzene copolymer.

* * * * *